United States Patent [19]

Siedlecki et al.

[11] 4,007,291
[45] Feb. 8, 1977

[54] METHOD FOR FIXING COFFEE GRINDER GAS

[75] Inventors: Dennis Ted Siedlecki, Babylon, N.Y.; James F. Meinhold, Jersey City, N.J.

[73] Assignee: General Foods Corporation, White Plains, N.Y.

[22] Filed: May 20, 1974

[21] Appl. No.: 471,631

[52] U.S. Cl. .............................. 426/594; 426/386; 426/417; 426/601

[51] Int. Cl.$^2$ .......................................... A23F 1/04

[58] Field of Search .......... 426/386, 387, 594, 388, 426/595, 417, 601

[56] References Cited

UNITED STATES PATENTS

| | | | |
|---|---|---|---|
| 2,680,687 | 6/1950 | Lemonnier | 426/386 X |
| 3,021,218 | 2/1962 | Clinton et al. | 426/386 |
| 3,535,118 | 10/1970 | Klein et al. | 426/386 |
| 3,783,163 | 1/1974 | Patel | 426/386 X |
| 3,823,241 | 7/1974 | Patel et al. | 426/386 |
| 3,836,682 | 9/1974 | Yadlowsky | 426/386 |

OTHER PUBLICATIONS

"Coffee Processing Technology" by Siretz, vol. 2, Pub. 1963, by Avi Pub. Co., Westport, Conn. pp. 34–35.

*Primary Examiner*—Frank W. Lutter
*Assistant Examiner*—N. Greenblum
*Attorney, Agent, or Firm*—Thomas R. Savoie; Bruno P. Struzzi

[57] ABSTRACT

Coffee grinder gas is fixed in a glyceride at relatively high levels by means of high pressure. Liquid nitrogen condensed grinder gas frost is contacted in a pressure vessel with an oil. Heat is supplied to the vessel to vaporize the frost, and after the contents of the vessel reach room temperature, and the liquid glyceride has absorbed grinder gas aromatics, the vessel is slowly depressurized. The aromatized liquid glyceride is then used for enhancing soluble coffee products.

6 Claims, No Drawings

METHOD FOR FIXING COFFEE GRINDER GAS

BACKGROUND OF THE INVENTION

This invention is related to commonly-assigned U.S. patent application, Ser. No. 371,784 filed June 20, 1973 entitled "Method for Aromatizing Soluble Coffee" wherein is disclosed a method for condensing the aromatic gases given off during the comminution of freshly roasted coffee in a vertically-mounted, scraped-wall heat exchanger which is cooled by means of liquid nitrogen. The condensed gases are collected at the bottom of the heat exchanger in the form of a frost or snow and this frost is mixed with a liquid glyceride and then combined with a coffee extract prior to drying the extract (e.g. freeze drying) or combined with a soluble coffee powder. This application is hereby incorporated by reference. This application is also related to commonly-assigned, concurrently-filed U.S. application, Ser. Nos. 471,633 now U.S. Pat. No. 3,939,291 and 471,632 which are also incorporated herein by reference.

Grinder gas, that is the gas which is released from roasted whole coffee beans when their internal cell structure is disrupted, such as during grinding of the beans and which also continues to be evolved from the disrupted and/or fractured bean for a short period thereafter, has long been recognized in the art as a highly desirable natural coffee aroma. The collection and stabilization of this aroma has however proven to be a difficult undertaking, especially when it is desired for use in a commercial-sized soluble coffee system.

The use of grinder gas as a means to enhance the jar aroma of a soluble coffee powder is disclosed in U.S. Pat. No. 3,021,218 to Clinton et al. which aromatizes the jar headspace and U.S. Pat. No. 2,306,061 to Johnston which condenses grinder gas aromatics onto chilled soluble coffee powder. The use of grinder gas condensates which are added to a liquid extract and dried in order to produce an improved cup aroma when the powder is dissolved in hot water is disclosed in U.S. Pat. No. 3,244,533 to Clinton et al. which homogenizes coffee oil in extract and then adds condensed grinder gas aromatics. Co-pending, commonly-assigned patent application, Ser. No. 252,883, filed May 12, 1972, now U.S. Pat. No. 3,821,447, discloses mixing condensed grinder gas frost with a liquid glyceride which mixture is then processed to remove excess water, such as by centrifugation, prior to being combined with soluble coffee solids (e.g. soluble powder).

SUMMARY OF THE INVENTION

The addition of the condensed aromatics to a glyceride material is a known method for attempting to stabilizing the aromatics. Such glycerides as coffee oil, bland-tasting vegetable oils and triacetin have proven especially useful for this purpose; however, other oils and low melting point fats may also be used. It has, however, been desired to maximize the amount of aromatics that are fixed in the glyceride carrier, since this would minimize aroma loss and would reduce the amount of the glyceride which would be incorporated with the soluble coffee product to obtain a desired amount of aromatization.

The process of this invention utilizes the principal of liquifaction to increase absorption of the aroma and flavor compounds, contained in a gaseous frost, by a liquid or liquefied glyceride. The process of this invention is suited for fixing aromatics contained in an aroma-bearing gas which has a high (e.g. above 80% by weight) carbon dioxide content, and which gas has been condensed as an aroma-bearing frost. This invention is particularly described in terms of coffee grinder gas; however it is to be understood that other aroma-bearing gases which have a high carbon dioxide content, such as coffee percolator vent gas and coffee roaster gas, may likewise be employed and are considered to be within the scope of this invention. The process, which may be conducted as a simple batch operation in a single pressure vessel or as a semi-continuous, countercurrent operation in a battery of pressure vessels, eliminates the need for laborious mixing of the gaseous frost and the liquid or liquefied glyceride. This mixing operation has proven to be troublesome in commercial operation, since contact between the condensed frost and the glyceride quickly congeals the glyceride thus making uniform mixing of the two components quite difficult. If the mixture is allowed to warm to a point where the glyceride exists as a liquid, many of the desirable, condensed aromatics all escape to the atmosphere.

According to one embodiment of this invention the aroma-bearing carbon dioxide frost, which may be obtained from a liquid nitrogen-cooled, scraped-surface heat exchanger, is placed in a pressure vessel together with a glyceride material at a ratio of grams of frost to grams of glyceride of about 0.5.1 to 6:1. The vessel is isolated from the atmosphere and the vessel contents are continuously supplied with heat by such means as a water jacket. Heat is supplied in sufficient quantities to raise the temperature of the glyceride above its congeal point, preferably the contents of the pressure vessel will reach at least room temperature. As the temperature of the carbon dioxide frost increases, a gaseous carbon dioxide phase of increasing pressure is developed and as the temperature increases above about $-69.9°$ F the remaining condensed carbon dioxide is converted from a solid phase to a liquid phase. As the temperature of the vessel contents exceeds the congeal point of the glyceride, the aromatics are readily dissolved in the liquid glyceride. It may be desirable to hold the vessel contents at a particular temperature above the congeal point of the glyceride in order to lengthen by an hour or more the contact time between the liquid glyceride and the aromatics. Agitation of the vessel contents such as by means of an internal stirrer may also be desirable in order to increase absorption of aromatics by the liquid glyceride. It has also proven beneficial to regulate the amount of frost which is placed into the vessel along with the glyceride to a level where no liquefied aroma-bearing $CO_2$ phase will exist at the temperature to which the vessel contents are ultimately raised; however, it will still be desirable to produce a saturated gas phase within the vessel. Avoidance of a liquid aroma-bearing $CO_2$ phase may be desirable since some of the aromatics may be more soluble in the liquid $CO_2$ phase than in the liquid glyceride phase.

Alternatively, instead of placing the glyceride into the vessel at the same time as the frost (i.e. before any heat is supplied to the vessel), it would be possible to permit the frost within the vessel to warm, say above the congeal point of the glyceride, before the glyceride is placed within the vessel.

After the frost and glyceride within the vessel reach the desired temperature, preferably about room temperature, and possibly after a hold-up period, the pressure within the vessel is slowly, preferably isothermally, released, care being taken to prevent the temperature from dropping below the congeal point of the glyceride. The resulting glyceride is found to contain more than twice the amount of aromatics obtained from manual mixing of the two components at atmospheric pressure. The aromatized glyceride should then be processed to remove excess water such as by centrifugation, as described in aforementioned Ser. No. 252,883.

The aromatized glyceride may be combined with coffee solids either in the form of dry soluble coffee, such as by conventional spray plating or any of the techniques disclosed in U.S. Pat. No. 3,769,032, or with a liquid coffee of coffee-like extract, prior to drying the extract. The aromatized glyceride may be solidified, such as by freezing, and comminuted, such as by grinding, prior to being mixed with the soluble coffee powder, such as disclosed in copending commonly-assigned patent application, Ser. No. 252,757, filed May 12, 1972 or prior to being combined with a liquid coffee extract, such as disclosed in now abandoned commonly-assigned patent application, Ser. No. 252,778, filed May 12, 1972, a slushed coffee extract, such as disclosed in commonly-assigned U.S. Pat. No. 3,809,770, or a partially frozen slab of coffee extract, such as disclosed in copending, commonly-assigned U.S. Pat. No. 3,809,766.

All of the aforementioned patents and commonly-assigned patent applications are hereby incorporated by reference.

DETAILED DESCRIPTION OF THE INVENTION

The most readily available source of grinder gas may be obtained by enclosing or hooding coffee grinding equipment, such as the commercial Gump grinders. The gases liberated from the ground coffee may be removed by a pump or rotary blower; additionally, when desired, a stream of inert, preferably moisture free, gas may be used to sweep gas from the coffee and to have the grinding operation take place in a substantially inert atmosphere. Such a process is described in U.S. Pat. No. 2,156,212 which describes a method of collecting gases evolved during roasting, but which can be equally applied to the collection of gases evolved during the grinding or cellular disruption of whole freshly roasted coffee beans. If pumping is employed it may be desirable to cool the gas ahead of the pump so that the heat added by pumping will not deteriorate the aromatics contained in the gas.

The chemical composition of the evolved gas is largely (i.e. above 90% by weight) carbon dioxide together with water vapor and the characteristic aromatic constituents of roasted coffee. The amount of moisture in the gas may be lowered by the use of low-moisture green beans, dry roasting conditions and low-moisture quenches or quenching mediums. The evolved gas is preferably passed through a first condenser where it is cooled to between 35° and 50° F and where substantial quantities of water are removed. The relatively low-moisture gas is then fed to a condenser, such as a jacketed, vertically-mounted, scraped-wall heat exchanger, which is cooled by means of a liquid gas refrigerant.

Preferably the condenser is cooled by means of liquid nitrogen and the gas flow into the exchanger is maintained within the range of about 1 to 5 cubic feet per minute per square foot of heat exchange surface. The nitrogen gas that evolves from the cooling system is useful as an inert gas stream which might be used elsewhere in the soluble coffee process, such as sweeping grinder gas from the grinder or inert gas packaging of the soluble coffee product.

The aroma bearing gas is condensed into the form of a frost as it comes into contact with the heat transfer wall of the condenser. The frost is removed from the condenser wall and collected for subsequent contact with a liquid glyceride phase. The frost may be held for a short period at low, such as liquid nitrogen, temperatures without deteriorating; however, it is preferred to immediately combine the frost with a glyceride in accordance with this invention. The glyceride, which preferably is coffee oil or a bland-tasting vegetable oil, such as cottonseed, corn or coconut oil, is combined with the frost at a level of about 0.5 to 6 grams of frost per gram of glyceride, preferably at about 1 to 4 grams of frost per gram of glyceride.

According to this invention contact between the grinder gas frost and the liquid glyceride phase occurs in a pressure vessel. Heat is added to the frost within the vessel, such as by means of a 70° F to 85° F water jacket, to sublime the grinder gas frost and form a headspace pressure. At approximately 75 p.s.i.a. solid $CO_2$ changes phase to liquid. The temperature corresponding to this phase change is −70° F. At this condition, water and any glyceride present, and some of the organic aromatics, are in the solid state. The temperature of the vessel contents is raised to a point above the congeal point of the glyceride, preferably to about room temperature, at which condition the grinder gas aromatics will diffuse and establish an equilibrium among the $CO_2$, glyceride and water phases which may be present within the pressure vessel. Temperatures in excess of about 85° F should be avoided as degradation of the coffee aromatics may result. Rapid heating of the vessel contents to above the congeal point of the glyceride may be desirable in order to increase the time period during which liquid glyceride is present. The end pressure developed in the vessel due to the frost should be in excess of 700 p.s.i.g. in order to liquefy a significant portion of the vaporized aromatics and to cause some of these liquefied aromatics to be dissolved in the glyceride. After the contents of the vessel have reached the desired temperature, and possibly after an equilibration period of up to several hours, pressure is slowly released, preferably in such a manner that the glyceride is maintained in a liquid state. According to this invention, isothermal venting is thought to be most preferred. Since the vent gas may contain desirable aromatics, it would be possible to recycle or reclaim vent gas aromatics.

After the pressure within the vessel is reduced, the aromatized glyceride is removed from the vessel. If liquid, this can be done by simply decanting or by draining the liquid through a valve in the bottom of the vessel. It would also be possible to permit residual pressure within the vessel to force the liquid out of a vertical withdrawal tube which protrudes through the upper portion of the vessel. This glyceride is then preferably processed so as to remove excess water.

If a liquid is removed from a pressurized vessel, any residual gas present in the vessel may be retained for use in a subsequent pressure fixation cycle.

The aromatized glyceride phase and any water phase which may be present in the vessel may be separated during removal from the vessel. Alternatively, since water will be the heaviest material within the vessel, it would be possible to remove the bottom liquid water phase during the pressure fixation cycle.

Removing water from the aromatized glyceride, preferably down to a level of 0.5% by weight or less, appears to further stabilize the grinder gas aromatics. As disclosed in the aforementioned application, Ser. No. 252,883, centrifugation, ultracentrifugation, molecular fractionation, drying agents and like method have proven to be successful techniques for removing water from the aromatized glyceride. As a further refinement of this water removal process, it is possible to separate any aromas from the removed water such as by vacuum distillation and to add these separated aromatics back to the aromatized glyceride.

The aromatized glyceride may be combined with soluble coffee powder or with coffee extract prior to drying the extract in accordance with any of the known prior art techniques or as disclosed in any of the previously enumerated copending, commonly assisgned patent applications. Typical levels of addition for the aromatized glyceride are 0.1 to 2% by weight glyceride based on the weight of soluble solids in the final product. The aromatized powder of this invention may constitute all or only a portion of the powder in the final product, as will be apparent to those skilled in the art.

The term coffee powder and coffee extract used in the description of this invention is meant to include materials containing in whole or in part coffee substitutes such as powders or extracts obtained in whole or in part from roasted cereals such as wheat, rye, barley and the like. One such item is the water extract and resulting dried powder of wheat, barley and molasses known as "Instant Postum".

This invention is further described but not limited by the following example:

EXAMPLE I

Coffee grinder gas which was evolved during grinding of freshly roasted coffee beans was passed through a water cooled condenser where 1.25 pounds of water per cubic foot of gas was removed. The gas was then passed to a liquid nitrogen-cooled, scraped-wall heat exchanger where it was condensed and collected as a frost.

80 lbs. of the frost were placed in a 4 cubic foot pressure vessel together with 40 lbs. of expressed coffee oil. The pressure vessel was immersed in a water bath maintained at about 70° F. After 3 hours the contents of the vessel had attained a temperature of about 70° F and a pressure of about 850 psig. The vessel was slowly vented to ambient pressure over the course of about 3 hours, care being taken to prevent such rapid drops in pressure as would cause the oil to solidfy. The vessel contents were centrifuged and about 2 lbs. of water per gallon of the liquid was removed. This aromatized "dry" oil when frozen at 20° F is found to remain stable for at least 3 days.

The frozen oil was thawed in a tap water bath and then spray plated onto the surface of agglomerated spray dried coffee at a level of 0.4% by weight. The plated product was packaged under an inert atmosphere and evaluated for jar aroma after several storage. A pleasant roasted coffee like aroma was exhibited by the product.

EXAMPLE II

The procedure of Example I was repeated with the exception that the coffee oil-frost contact was effected by manual mixing in an unpressurized vessel. Although comparable stability for the frozen oil was obtained, the jar aroma of the plated coffee powder was found to have significantly less impact albeit comparable quality, than that of Example I. Gas chromatograph analysis of the two samples indicated an aromatic level for the jar aroma of Example I of about twice that of Example II.

EXAMPLE III

A 1 liter pressure bomb, provided with a glass window, was charged with 300 grams of condensed grinder gas frost (5% $H_2O$) and 150 milliliters of expressed coffee oil. The bomb was then sealed and placed in a 70° F water bath. After several hours the contents had obtained a temperature of about 70° F and a pressure of about 850 p.s.i.g. Observation of the bomb contents revealed the presence of a yellow-green layer of liquid carbon dioxide estimated to be about 124 grams. The bomb was then isothermally vented and the aromatized oil was centrifuged to remove water.

EXAMPLE IV

Using the procedure of Example III the one-liter bomb was charged with 200 grams of the grinder gas frost and 100 milliliters of oil. When the contents reached 70° F, the bomb pressure was 790 p.s.i.g. and no liquid carbon dioxide layer was observed. The bomb was again isothermally vented and the oil centrifuged.

EXAMPLE V

The "dry" oils of Example III and IV were qualitatively evaluated for aroma and found to be comparable and to contain a fresh coffee aroma. Gas chromatograph analysis of jar headspace aromas prepared from the two oils indicated a higher level of aromatics for the oil of Example IV.

Having thus described the invention what is claimed is:

1. A method for aromatizing soluble coffee with an aromatized glyceride comprising the steps of:
    a. condensing, as a frost, an aroma-containing gas which has a high carbon dioxide content,
    b. placing the aroma-containing frost in a pressure vessel,
    c. isolating the vessel from the atmosphere,
    d. supplying heat to the contents of the vessel to produce an internal pressure of at least 700 p.s.i.g. and an internal temperature above the congeal point of the glyceride carrier of step e,
    e. contacting, within said pressurized vessel, the frost aromas and a liquid glyceride phase, said glyceride being present in the vessel at a level of about 1 gram of glyceride to 0.5 to 6 grams of the frost,
    f. thereafter, slowly and isothermally releasing the pressure within the vessel so that the glyceride carrier is maintained in a liquid state, and then,
    g. combining the aromatized glyceride with coffee solids.

2. The method of claim 1 wherein the aromatized glyceride is added to soluble coffee powder.

3. The method of claim 1 wherein contact between the frost aromas and the liquid glyceride is maintained for a period in excess of 1 hour.

4. The method of claim 3 wherein heat is supplied to the sealed pressure vessel by means of a water bath at 70° to 85° F.

5. The method of claim 1 wherein the aroma-bearing gas is obtained by disrupting the cellular structure of freshly roasted coffee beans.

6. The method of claim 1 wherein heat is supplied to the vessel by means of a 70° F. to 85° F. water jacket.

* * * * *

UNITED STATES PATENT AND TRADEMARK OFFICE
CERTIFICATE OF CORRECTION

PATENT NO. : 4,007,291
DATED : February 8, 1977
INVENTOR(S) : Dennis Ted Siedlecki et al.

It is certified that error appears in the above-identified patent and that said Letters Patent are hereby corrected as shown below:

In column 5, line 19, change "assisgned" to -- assigned --; line 61, after "several" insert -- weeks --.

Signed and Sealed this

Twenty-first Day of June 1977

[SEAL]

Attest:

RUTH C. MASON
Attesting Officer

C. MARSHALL DANN
Commissioner of Patents and Trademarks